United States Patent
Figgins et al.

(10) Patent No.: US 9,472,997 B2
(45) Date of Patent: Oct. 18, 2016

(54) RESILIENT ROTOR ASSEMBLY FOR INTERIOR PERMANENT MAGNET MOTOR

(71) Applicant: Regal Beloit America, Inc., Beloit, WI (US)

(72) Inventors: Daniel S. Figgins, Fort Wayne, IN (US); Harold C. Kingrey, Blue Ridge, GA (US); Jeffrey A. Hall, Fort Wayne, IN (US); Kerry B. Shelton, Fort Wayne, IN (US); Subhash M. Brahmavar, Fort Wayne, IN (US); Peter B. Lytle, Fort Wayne, IN (US); Michael W. Henry, Fort Wayne, IN (US)

(73) Assignee: Regal Beloit America, Inc., Beloit, WI (US)

( * ) Notice: Subject to any disclaimer, the term of this patent is extended or adjusted under 35 U.S.C. 154(b) by 624 days.

(21) Appl. No.: 14/036,515

(22) Filed: Sep. 25, 2013

(65) Prior Publication Data

US 2014/0021810 A1 Jan. 23, 2014

Related U.S. Application Data

(63) Continuation of application No. 12/786,720, filed on May 25, 2010, now Pat. No. 9,013,074.

(51) Int. Cl.
*H02K 5/24* (2006.01)
*H02K 1/30* (2006.01)
(Continued)

(52) U.S. Cl.
CPC *H02K 5/24* (2013.01); *H02K 1/30* (2013.01); *H02K 15/03* (2013.01); *H02K 1/276* (2013.01); *H02K 1/2786* (2013.01); *Y10T 29/49012* (2015.01)

(58) Field of Classification Search
CPC .... H02K 1/276; H02K 1/2786; H02K 15/03; H02K 5/24; H02K 21/12
USPC .............. 310/51, 156.12, 156.13, 156.56, 91
See application file for complete search history.

(56) References Cited

U.S. PATENT DOCUMENTS 5,223,775 A 6/1993 Mongeau
5,258,678 A 11/1993 Futami
(Continued)

FOREIGN PATENT DOCUMENTS

WO 2008/123735 A1 10/2008

OTHER PUBLICATIONS

Young's modulus, www.engineeringtoolbox.com/young-modulus-d_417.htm,Feb. 2007.
(Continued)

*Primary Examiner* — Terrance Kenerly
(74) *Attorney, Agent, or Firm* — Armstrong Teasdale LLP (57) ABSTRACT

An electric motor comprises a shaft, an interior magnet rotor core comprising a central bore and a pair of opposing ends faces, and at least one resilient structure inserted within the central bore between the pair of opposing end faces. The at least one resilient component is inserted within the central bore between the pair of opposing end faces such that the at least one resilient component does not extend beyond one of the opposing end faces. The resilient component comprises an outer rigid structure inserted within the central bore, a resilient component inserted within the outer rigid structure, and an inner rigid structure inserted within the resilient component, wherein the shaft is inserted through the inner rigid structure.

20 Claims, 9 Drawing Sheets

(51) Int. Cl.
*H02K 15/03* (2006.01)
*H02K 1/27* (2006.01)

(56) References Cited

U.S. PATENT DOCUMENTS

| | | | |
|---|---|---|---|
| 5,321,575 A | 6/1994 | Shilo | |
| 5,444,341 A | 8/1995 | Kneifel, II et al. | |
| 5,555,150 A | 9/1996 | Newman, Jr. | |
| 5,592,058 A | 1/1997 | Archer et al. | |
| 5,650,680 A | 7/1997 | Chula | |
| 5,704,111 A | 1/1998 | Johnson et al. | |
| 5,811,904 A | 9/1998 | Tajima et al. | |
| 6,034,460 A | 3/2000 | Tajima et al. | |
| 6,144,131 A | 11/2000 | Hollenbeck et al. | |
| 6,188,157 B1 | 2/2001 | Tajima et al. | |
| 6,208,054 B1 | 3/2001 | Tajima et al. | |
| 6,326,750 B1 | 12/2001 | Marcinkiewicz | |
| 6,348,752 B1 | 2/2002 | Erdman et al. | |
| 6,396,183 B1 | 5/2002 | Tajima et al. | |
| 6,396,229 B1 | 5/2002 | Sakamoto et al. | |
| 6,423,118 B1 | 7/2002 | Becerra et al. | |
| 6,445,100 B2 | 9/2002 | Tajima et al. | |
| 6,628,099 B2 | 9/2003 | Iwaji et al. | |
| 6,650,081 B2 | 11/2003 | Iwaji et al. | |
| 6,717,314 B2 | 4/2004 | Horst et al. | |
| 6,734,592 B2 | 5/2004 | Tajima et al. | |
| 6,794,784 B2 | 9/2004 | Takahashi et al. | |
| 6,798,103 B2 | 9/2004 | Tajima et al. | |
| 6,800,979 B2 | 10/2004 | Kato et al. | |
| 6,822,360 B2 | 11/2004 | Tajima et al. | |
| 6,876,117 B2 | 4/2005 | Tajima et al. | |
| 6,949,856 B2 | 9/2005 | Tajima et al. | |
| 7,119,470 B2 | 10/2006 | Tajima et al. | |
| 7,183,686 B2 | 2/2007 | Sasaki et al. | |
| 7,196,447 B2 | 3/2007 | Tajima et al. | |
| 7,312,970 B2 | 12/2007 | Skinner | |
| 7,342,379 B2 | 3/2008 | Marcinkiewicz et al. | |
| 7,378,773 B2 | 5/2008 | Tajima et al. | |
| 7,626,349 B2 | 12/2009 | Marcinkiewicz et al. | |
| 7,626,943 B2 | 12/2009 | Nakano | |
| 2002/0190595 A1 | 12/2002 | Han et al. | |
| 2003/0020337 A1 | 1/2003 | Joachim | |
| 2003/0102755 A1 | 6/2003 | Naito et al. | |
| 2005/0152085 A1 | 7/2005 | Skinner | |
| 2005/0231880 A1 | 10/2005 | Sunaga et al. | |
| 2006/0103253 A1 | 5/2006 | Shiga et al. | |
| 2007/0096584 A1 | 5/2007 | Erfanfar | |
| 2007/0108862 A1 | 5/2007 | Sasaki et al. | |
| 2007/0222326 A1 | 9/2007 | Ionel et al. | |
| 2007/0267924 A1 | 11/2007 | Dellinger | |
| 2008/0315691 A1 | 12/2008 | Jeung | |
| 2009/0108686 A1 | 4/2009 | Jeung | |
| 2010/0327676 A1 | 12/2010 | Bi et al. | |
| 2011/0291514 A1 | 12/2011 | Figgins et al. | |
| 2012/0104882 A1 | 5/2012 | Pan | |

OTHER PUBLICATIONS

Office Action issued in U.S. Appl. No. 12/786,720 mailed on Nov. 14, 2013.

RESILIENT ROTOR ASSEMBLY FOR INTERIOR PERMANENT MAGNET MOTOR

CROSS-REFERENCE TO RELATED APPLICATIONS

This application is a continuation application of and claims priority to U.S. patent application Ser. No. 12/786,720, filed May 25, 2010, which is hereby incorporated by reference in its entirety.

BACKGROUND

This disclosure relates to electronically commutated motors (ECMs), and more particularly, to methods and approaches used for providing a resilient rotor assembly for such motors, which are sometimes referred to as brushless motors. Brushless motors include brushless AC motors and brushless DC motors.

Brushless motors are used in a wide variety of systems operating in a wide variety of industries. As such, the brushless motors are subject to many operating conditions. In such a brushless motor, a permanent magnet rotor and the produced torque may combine to result in cogging, as well as commutation torque pulses. The cogging and the torque pulses may get transmitted to the shaft of the motor, and then onto a fan or blower assembly that is attached to the shaft. In such applications these torque pulses and the effects of cogging may result in acoustical noise that can be objectionable to an end user of the motor.

To counter such operating conditions, introduction of a resiliency between the component that is producing these torque pulses and the shaft that transmits the torque to the fan or blower, which is attached to the shaft, would be desirable. However, the resilient rotor constructions that have been designed and produced are related to such motors where the permanent magnet structure is such that magnets are mounted on the surface of the rotor. In such systems, the resilient components are attached to a central core by metal rods or clips, spot welding, or by tig welding. However, in an interior permanent magnet rotor design, where magnets are interior to the rotor and a laminated structure is used for rotor core, it is difficult to attach a resilient component to rotor core by tig welding or spot welding without increasing a length of the rotor.

BRIEF DESCRIPTION OF THE INVENTION

In one aspect, an electric motor is provided. The electric motor comprises a shaft, an interior magnet rotor core comprising a central bore and a pair of opposing ends faces, and at least one resilient structure inserted within the central bore between the pair of opposing end faces. The at least one resilient component is inserted within the central bore between the pair of opposing end faces such that the at least one resilient component does not extend beyond at least one of the opposing end faces. The resilient component comprises an outer rigid structure inserted within the central bore, a resilient component inserted within the outer rigid structure, and an inner rigid structure inserted within the resilient component, wherein the shaft is inserted through the inner rigid structure.

In another aspect, a rotor assembly is provided. The rotor assembly comprises a pair of opposing end faces and an interior magnet rotor core positioned between the pair of opposing end faces, wherein the rotor core includes a central rotor core bore. A resilient component includes a central resilient component bore and is coupled to the rotor core within the central rotor core bore and between the pair of opposing end faces. An inner rigid structure includes a central inner rigid structure bore and is coupled to the resilient component within the central resilient component bore and between the pair of opposing end faces. The central inner rigid structure bore is configured to receive a shaft.

In still another aspect, a method of assembling an interior magnet rotor core motor is provided. The method comprises providing an interior magnet rotor core including a central rotor core bore and a pair of opposing ends faces. An outer rigid structure including a central outer rigid structure bore is coupled within the central rotor core bore. A resilient component including a central resilient component bore is coupled within the central outer rigid structure bore. The method further comprises coupling an inner rigid structure within the central resilient component bore, wherein the inner rigid structure includes a central inner rigid structure bore, and coupling a shaft within the central inner rigid structure bore. The outer rigid structure, the resilient component, and the inner rigid structure are positioned between the pair of opposing end faces such that none of the outer rigid structure, the resilient component, and the inner rigid structure extend beyond at least one of the opposing end faces.

DETAILED DESCRIPTION OF THE INVENTION

As described above, the permanent magnet rotor and torque production in a brushless motor may result in cogging and commutation torque pulses that get transmitted to the motor shaft, and then onto an end device, possibly resulting in objectionable acoustical noise. Described herein are methods and apparatus for introducing a resiliency between the motor component that is producing these torque pulses and the motor shaft that transmits the torque pulses to the fan or blower, which may be attached to the shaft. The described method for attaching the resilient component to the central rotor core is particularly suitable for laminated inner and outer rigid structures where welding may not be practical. The described embodiments outline attachment of the resilient component to a central rotor core without using any welding operations or without extending length of the rotor.

Figure 1:
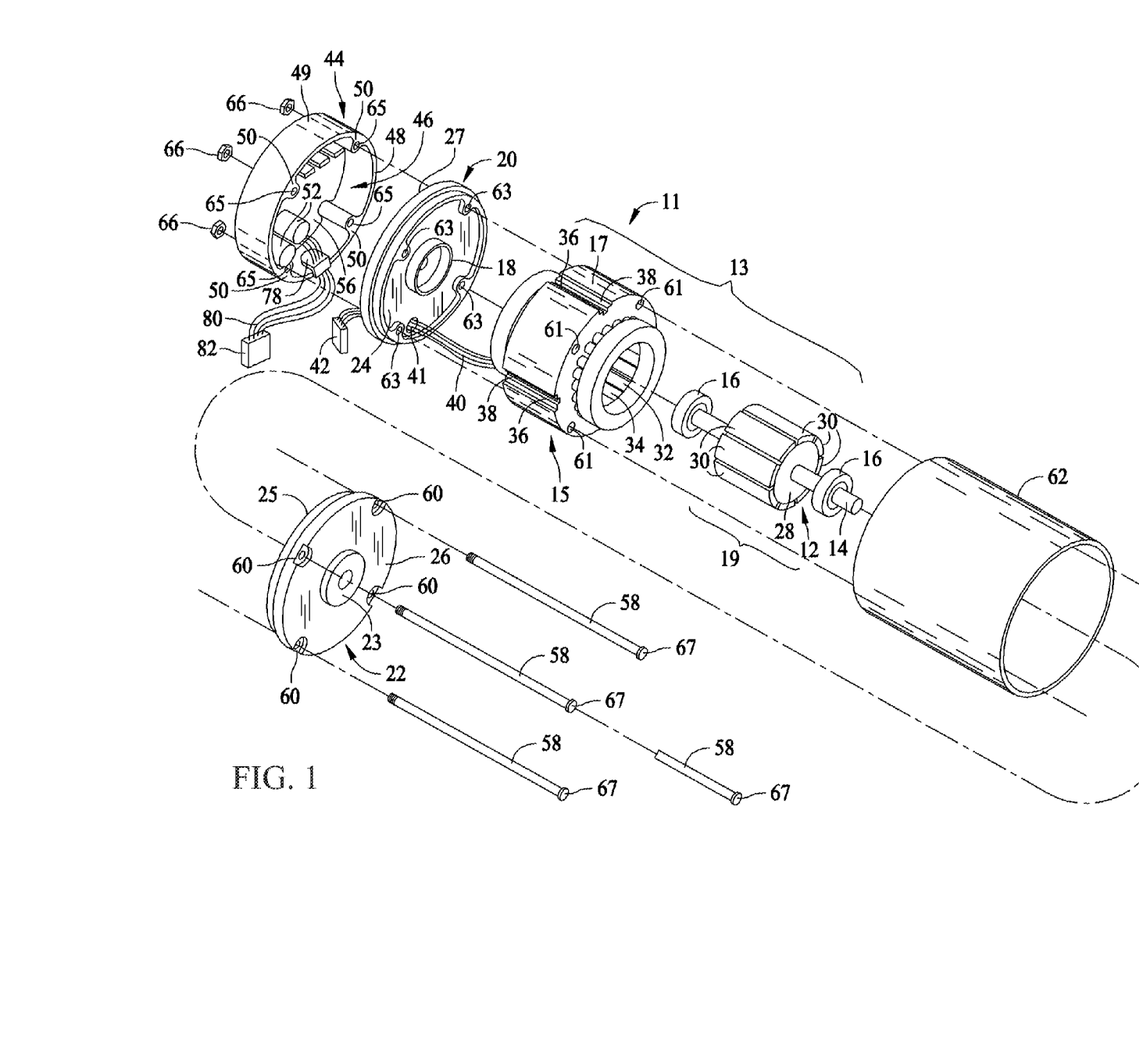
FIG. 1 is an exploded view of an integrated electronically commutated motor (ECM) (e.g., a brushless motor) and associated control circuit assembly.
Figure 2:
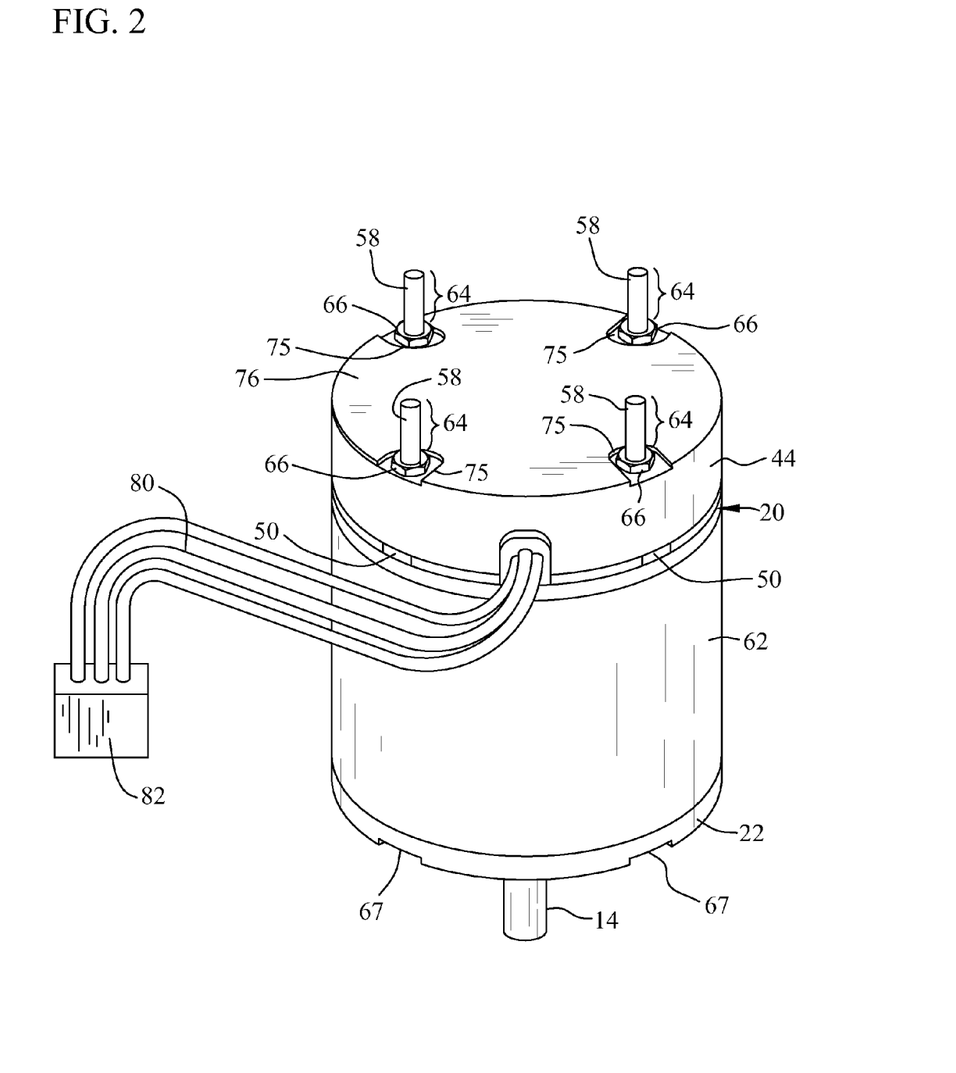
FIG. 2 is a fully assembled view of the motor and control circuit assembly of FIG. 1.

Now referring to the figures, and more particularly to FIGS. 1 and 2, reference character 11 generally designates an integrated electronically commutated (brushless) motor and control circuit assembly. Motor assembly 11 includes a brushless motor 13 having a stationary assembly 15 including a stator or core 17 and a rotatable assembly 19 including a permanent magnet rotor 12 and a shaft 14. While rotor 12 is an illustration of an exterior permanent magnet rotor, interior permanent magnet rotors are also known and are mounted within a motor assembly and magnetically coupled to the stator in the same manner as the exterior permanent magnet rotor 12 shown in FIG. 1. A fan (not shown) or other means to be driven such as means for moving air through an air handling system engages the shaft 14. Specifically, motor assembly 11 is for use in combination with an air handling system such as an air conditioning system including a fan for blowing air over cooling coils for supplying the cooled air to a building.

Rotor 12 is mounted on and attached to the shaft 14, for example, by a keying arrangement. The shaft 14 is further journaled for rotation in conventional bearings 16. The bearings 16 are mounted in bearing supports 18 integral with a first end member 20 and a second end member 22. The end members 20 and 22 are substantially flat and parallel to each other. The end members 20 and 22 have inner facing sides 24, 25 between which the stationary assembly 15 and the rotatable assembly 19 are located. Each end member 20 and 22 has an outer side 26, 27 opposite its inner side 24, 25. Additionally, second end member 22 has an aperture 23 for the shaft 14 to pass through and extend out from the outer side 26.

Figure 5:
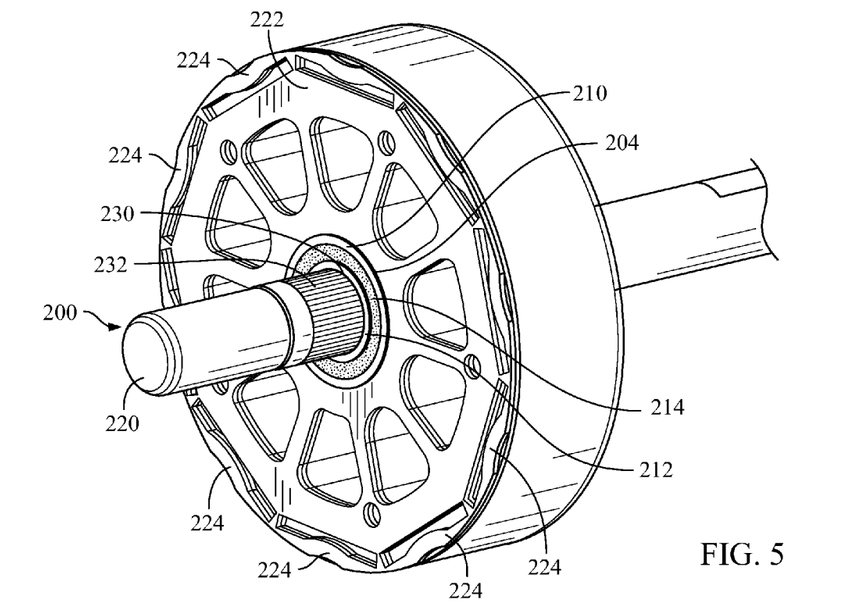
FIG. 5 is an illustration of one embodiment of an interior permanent magnet rotor that incorporates a resilient rotor assembly.

The rotor 12 comprises a ferromagnetic core 28 and is rotatable within the bore of stator 17. Eight essentially identical magnetic material elements or relatively thin arcuate segments 30 of permanent magnet material, each providing a relatively constant flux field, are secured, for example, by adhesive bonding to rotor core 28. The segments 30 are magnetized to be polarized radially in relation to the rotor core 28 with adjacent segments 30 being alternately polarized as indicated. While magnets 30 on rotor 12 are illustrated for purposes of disclosure, it is contemplated that other rotors having different constructions, such as an interior permanent magnet rotor (as shown in FIG. 5) and other magnets different in both number, construction, and flux fields may be utilized with such other rotors within the scope of the invention so as to meet at least some of the objects thereof.

Stationary assembly 15 comprises a plurality of winding stages 32 adapted to be electronically energized to generate an electromagnetic field. Stages 32 are coils of wire wound around teeth 34 of the laminated stator core 17. The core 17 may be held together by four retainer clips 36, one positioned within each notch 38 in the outer surface of the core 17. Alternatively, the core 17 may be held together by other suitable means, such as for instance welding or adhesively bonding, or merely held together by the windings, all as will be understood by those skilled in the art. The winding end turns extend beyond the stator end faces and winding terminal leads 40 are brought out through an aperture 41 in the first end member 20 terminating in a connector 42. While stationary assembly 15 is illustrated for purposes of disclosure, it is contemplated that other stationary assemblies of various other constructions having different shapes and with different number of teeth may be utilized within the scope of the invention so as to meet at least some of the objects thereof Motor assembly 11 further includes a cap 44 which is mounted on the rear portion of the motor assembly 11 to enclose within the cap 44 control means 46 for the motor 13. The cap 44 includes an edge 48 having a plurality of spacing elements 50 projecting therefrom which engage the outer side 27 of the first end member 20. Cap 44 includes a substantially annular side wall 49 with the top of the side wall 49 forming edge 48. The control means 46 is positioned adjacent the outer side 27 of the first end member 20. The control means 46 includes a plurality of electronic components 52 and a connector (not shown) mounted on a component board 56, such as a printed circuit board. The control means 46 is connected to the winding stages 32 by interconnecting connector 42 and connector 54. The control means 46 applies a voltage to one or more of the winding stages 32 at a time for commutating the winding stages 32 in a preselected sequence to rotate the rotatable assembly 19 about an axis of rotation.

Connecting elements 58 comprising a plurality of bolts pass through bolt holes 60 in the second end member 22, bolt holes 61 in core 17, bolt holes 63 in first end member 20, and bolt holes 65 in cap 44. The head 67 of the connecting elements 58 engage the second end member 22. The connecting elements 58 are adapted to urge the second end member 22 and the cap 44 toward each other thereby supporting the first end member 20, the stationary assembly 15, and the rotatable assembly 19 therebetween. Additionally, a housing 62 may be positioned between the first end member 20 and the second end member 22 for enclosing and protecting the stationary assembly 15 and the rotatable assembly 10.

Brushless motor 13 as described herein merely for purposes of disclosure is an eight rotor-pole motor, but it will be understood that the brushless motors described herein may include any even number of rotor poles and the number of stator poles are a multiple of the number of rotor poles, for example, the number of stator poles may be based on the number of phases. In one exemplary embodiment not shown in the figures, a three-phase brushless motor includes six rotor pole pairs and 18 stator poles.

The motor assembly 11 according to the invention operates in the following manner. When the winding stages 32 are energized in a temporal sequence three sets of eight magnetic poles are established that will provide a radial magnetic field which moves clockwise or counterclockwise around the core 17 depending on the preselected sequence or order in which the stages are energized. This moving field intersects with the flux field created by the magnet 30 to cause the rotor to rotate relative to the core 17 in the desired direction to develop a torque which is a direct function of the intensities or strengths of the magnetic fields.

The winding stages 32 are commutated without brushes by sensing the rotational position of the rotatable assembly 19 as it rotates within the core 17 and utilizing electrical signals generated as a function of the rotational position of the rotor 12 sequentially to apply a DC voltage to each of the winding stages 32 in different preselected orders or sequences that determine the direction of the rotation of the rotor 12. Position sensing may be accomplished by a position-detecting circuit responsive to the back electromotive force (EMF) to provide a simulated signal indicative of the rotational position of the rotor 12 to control the timed sequential application of voltage to the winding stages 32 of the motor 13. Other means of position sensing may also be used.

FIG. 2 illustrates the fully assembled motor assembly 11. Connecting elements 58 pass through the second end member 22, the stationary assembly 15, the first end member 20, and the cap 44. The connecting elements 58 have a portion 64 which projects laterally from the cap 44. Portion 64 is adapted to engage a support structure (not shown) for supporting the motor assembly 11. The connecting elements 58 may be secured in place by placing a nut 66 engaging the threads on each of the portions 64 of the connecting elements 58. A wiring harness 80 and connector 82 are utilized to connect motor assembly 11 to an electrical power source.

Indentations 75 are formed in a bottom 76 of the cap 44 which provide a space for a tool (not shown) to fit in to tighten the nuts 66. The indentations 75 also allow the nuts 66 to be mounted on the connecting elements 58 flush with the bottom 76 of the cap 44.

Figure 3:
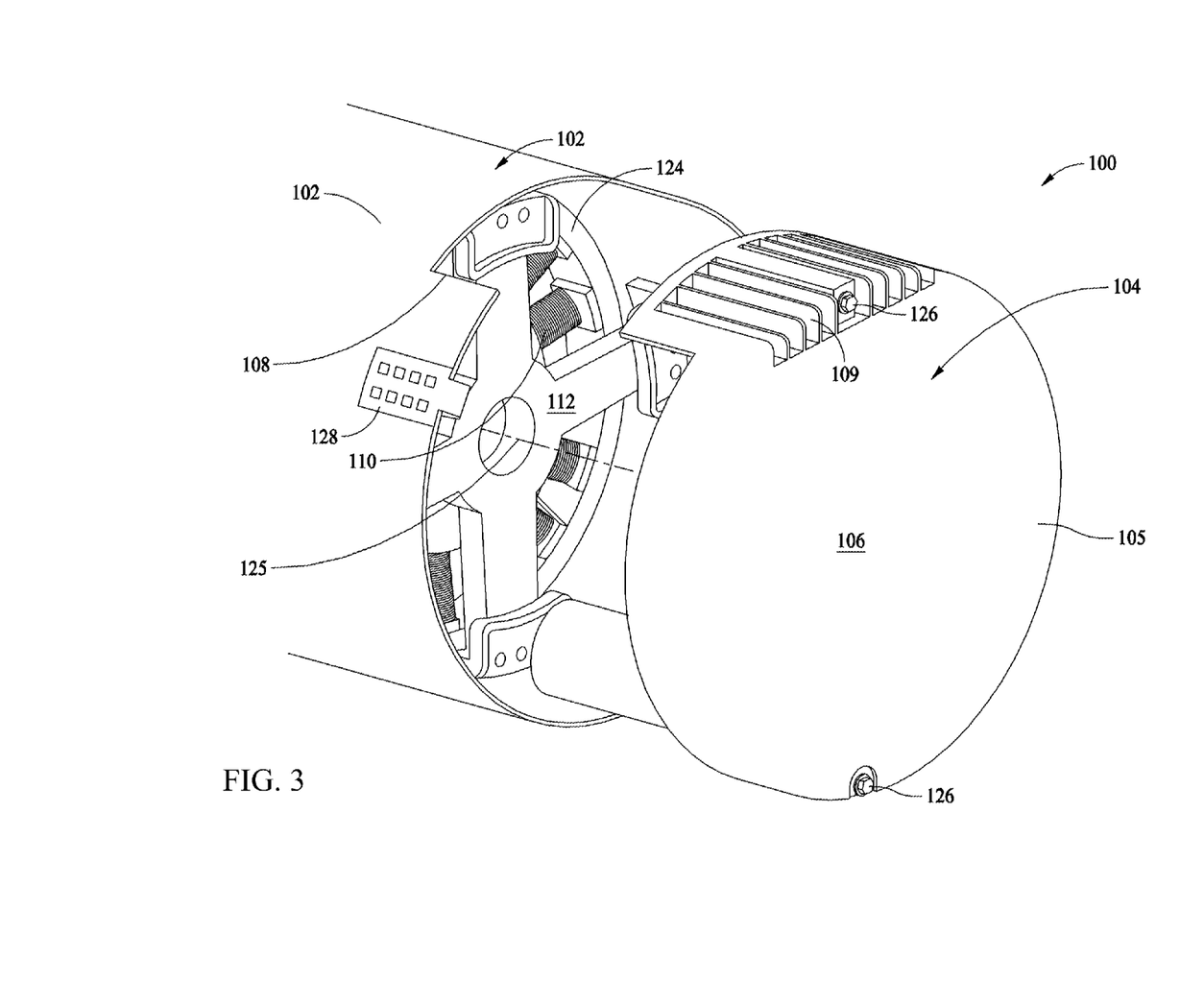
FIG. 3 is an exploded partial view of a motor configured such that a control circuit associated therewith fits into the main chassis of the motor.

FIG. 3 is an exploded end view of an alternative embodiment for a motor 100. Motor 100 includes a motor enclosure 102 and a motor control unit 104 configured for attachment to motor enclosure 102. A chassis 105 of motor control unit 104 serves as an end shield 106 for motor 100. Motor enclosure 102 also includes a slot 108 which engages a heat sink 109 formed in chassis 105 as further described below. While motor control unit 104 includes chassis 105, motor 100 is configured such that motor enclosure 102 provides substantially all of the enclosure for motor control unit 104. Within motor enclosure 102 are windings 110 of motor 100 and a mid shield 112 configured for placement between windings 110 and motor control unit 104.

The placement and configuration of mid shield 112 allows motor control unit 104 of motor 100 to be removed and replaced without disruption or displacement of a motor winding assembly 124 which includes windings 110 of motor 100. As illustrated, motor enclosure 102 is configured to form a part of the enclosure for motor control unit 104, along with end shield 106, allowing for a one-piece enclosure configuration. Mid shield 112 is also configured to meet any airflow, voltage clearances and assembly height limitations imposed on motor 100.

In one embodiment, as illustrated, mid shield 112 fits precisely with respect to a centerline 125 of motor 100 and further aligns with two bolts 126 that pass through end shield 106 of motor control unit 104 to clamp and secure mid shield 112 and motor control unit 104 within motor enclosure 102. This alignment and symmetry remain even when chassis 105 containing the electronics of motor control unit 104 is removed. Retaining the alignment and symmetry within enclosure 102 is important as it lowers a replacement cost of motor control unit 104 in the field. Mid shield 112 also contributes to a lower material cost for motor 100, because with mid shield 112, motor enclosure 102 is utilized as a part of the containment enclosure for portions of motor control unit 104 as shown in FIG. 3, decreasing the size of motor 100 as compared to motor 11 (shown in FIGS. 1 and 2). Additionally, such a configuration allows for a placement of a power connector 128 that is flush with chassis 102.

Utilization of mid shield 112 allows motor control unit 104 to be removed from enclosure 102 without disturbing the rest of the motor assembly, for example, windings 110.

The non-disturbance is obtained by using mid shield 112 to secure a bearing that engages a motor shaft (neither shown in FIG. 1) of motor 100. Therefore, enclosure 102 is additionally configured to provide any required clearances for the electrical components (e.g., motor control unit 104) of motor 100 to allow disengagement of motor control unit 104 from motor 100.

Figure 4:
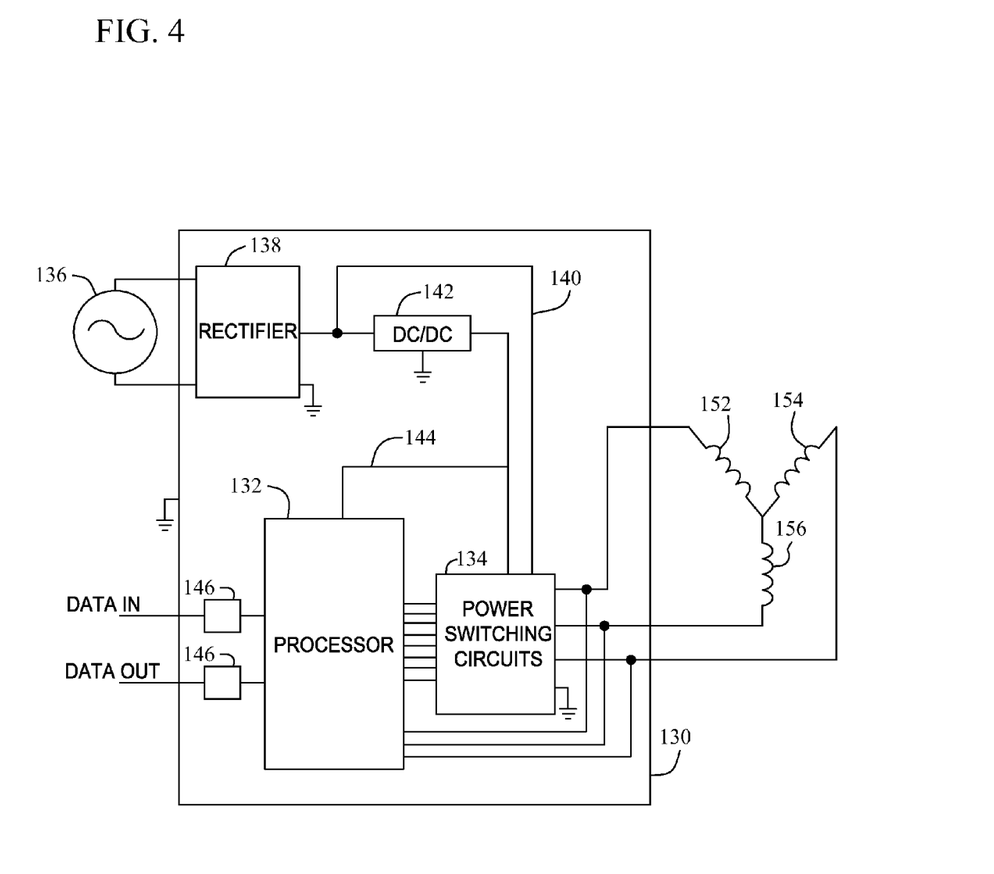
FIG. 4 is a block diagram of a control circuit for an ECM.

FIG. 4 is a simplified block diagram of an ECM control circuit 130 that includes a processor 132 and a plurality of power switching circuits 134. Typically, an ECM is powered utilizing an AC voltage 136 that is rectified by a rectifier 138 to provide a high voltage DC source 140 to power the windings of an ECM. A DC/DC converter 142 is utilized to provide an operating voltage 144 for processor 132 and power switching circuits 134. Isolation devices 146 are utilized to electrically isolate processor 132 from external devices while allowing communications to and from the external devices. As further described below, processor 132 is programmed to operate power switching circuits 134 to selectively connect (and disconnect) windings 152, 154, and 156 of the ECM to the high voltage DC source 140 to cause a rotation of a rotor of the ECM. Additionally, and in one embodiment, ECM control circuit 130 is configured to include one or more circuits for determining a speed and torque associated with operation of the ECM.

In operation, circuitry of ECM control circuit 130 is configured according to the user's requirements. The circuitry may be configured as any of the following non-exclusive circuits alone or in combination, for example, a power supply regulating circuit, an electromagnetic interference filter, an electronically commutated motor speed modulator, an electronically commutated motor torque modulator, a transient suppression circuit, an active power factor correction circuit, a passive power factor correction circuit and a process parameter control circuit. However, this list should not be construed as limiting as other circuitry configurations exist.

FIG. 5 is an illustration of one embodiment of an interior permanent magnet rotor 200 that incorporates a resilient configuration. The resilient rotor configuration in the interior permanent magnet rotor is beneficial in the suppression of vibration transmissibility from the motor. In the illustrated embodiment, the resilient rotor 200 includes a resilient structure 204 that includes an outer rigid structure 210, an inner rigid structure 212, and a resilient component 214 that is in the annular space between the inner rigid structure 212 and the outer rigid structure 210. As shown in FIG. 5, these three components are located proximate a hub of rotor 200 such that inner rigid structure 212 engages shaft 220 and outer rigid structure 210 engages, for example, a laminated structure 222 that makes up the remainder of the rotor and houses the various interior permanent magnets 224 therein. In embodiments, an interior surface 230 of inner rigid structure 212 is attached to the corresponding portion 232 of shaft 220 to provide rotation of shaft 220. In specific embodiments, interior surface 230 of inner rigid structure 212 as well as the corresponding portion 232 of shaft 220 are keyed such that rotation of rotor 200 ensures rotation of shaft 220.

In various embodiments, the three components (outer rigid structure 210, inner rigid structure 212, and resilient component 214) are fabricated as separate components or are molded together as a single component. Fabrication includes placing inner rigid structure 212 within a bore extending through the resilient component. In various implementations, two resilient structures 204 are utilized in a motor configuration, for example, one on each end of a rotor.

Alternatively, a single resilient structure 204 may be utilized proximate the axial center of rotor 200.

In various embodiments resilient component 214 is a thermoset material or a thermoplastic material, for example rubber, or other elastomeric, low modulus material of between about 30 and about 70 MPa (MegaPascals), which is either preformed or formed in place. In one embodiment, resilient component 214 is formed in place such that it is attached to the inner rigid structure 212. Resilient structure 204 can be attached to the central rotor core (laminated structure 222) using various mechanical devices, including, but not limited to, rivets, bolts and nuts, keyways, adhesives, and columns that are inserted, injected or cast. Alternatively, resilient structure 204 may be press fit within the rotor core in a fashion similar to the seating of a bearing.

Figure 6:
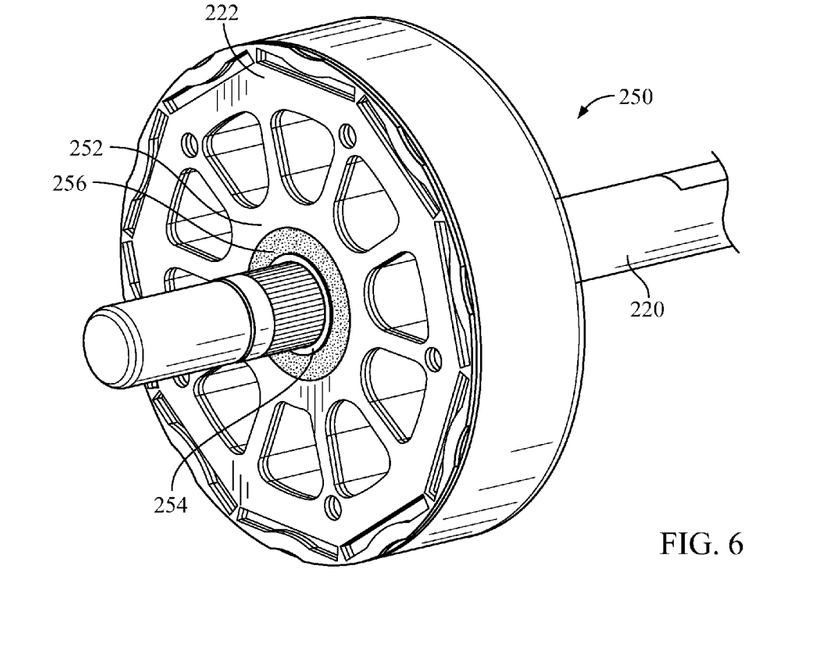
FIG. 6 is an illustration of one embodiment of an interior permanent magnet rotor that incorporates a resilient rotor assembly, with a portion of the rotor core forming a part of the resilient assembly.

FIG. 6 illustrates another embodiment of a rotor 250 in which a central rotor core 252 operates as the outer rigid structure. An inner rigid structure 254 and resilient component 256 are equivalent to inner rigid structure 212 and resilient component 214 shown in FIG. 5, though they may be of different diameters due to the lack of a separate outer rigid structure and the manufacturing preference of having a single central rotor core 222 and shaft 220.

The above described embodiments are associated with a resilient rotor construction for an interior permanent magnet rotor used, for example, in a brushless motor. The resilient rotor assembly helps to suppress the cogging and commutation torque pulses known to occur in a permanent magnet rotor which does not incorporate a resilient rotor assembly.

Figure 7:
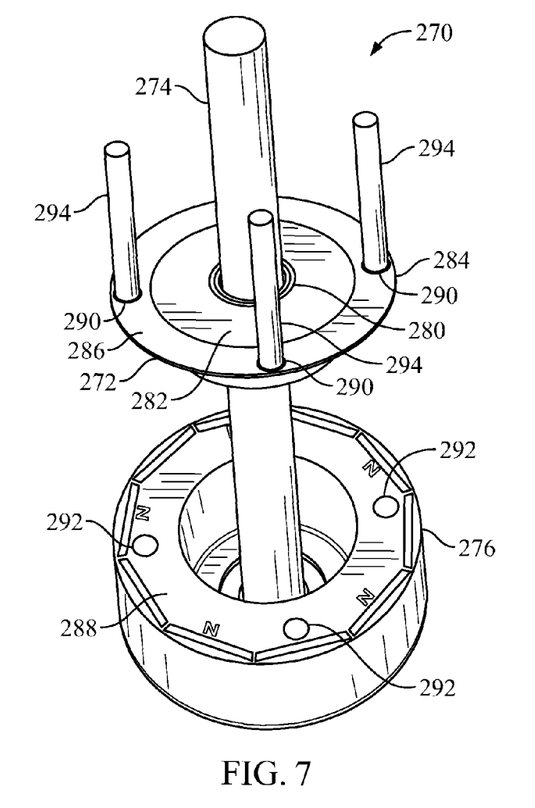
FIG. 7 illustrates construction of one rotor assembly embodiment that incorporates a resilient member between the shaft and the rotor core.

FIG. 7 illustrates construction of a rotor assembly 270 that incorporates a resilient assembly 272 that attaches a shaft 274 and a rotor core 276. An inner rigid structure 280 is similar to, or the same as, those previously described as is the resilient component 282. In the embodiment of FIG. 7, the outer rigid structure 284 includes a flange 286 that is placed adjacent a face 288 of rotor core 276. In the embodiment, flange 286 is formed with one or more holes 290 therein. These holes 290 are placed in flange 286 such that they align with bores 292. An attachment device, for example, pins 294 shown in FIG. 7 may be utilized to maintain the relative placement of flange 286 with respect to rotor core 276 through placement of pins 294 through respective holes 290 and bores 292. As is known, rotor core 276 may be a laminated structure with each layer being formed with bores 292 therein prior to assembly of core 276.

Figure 8:
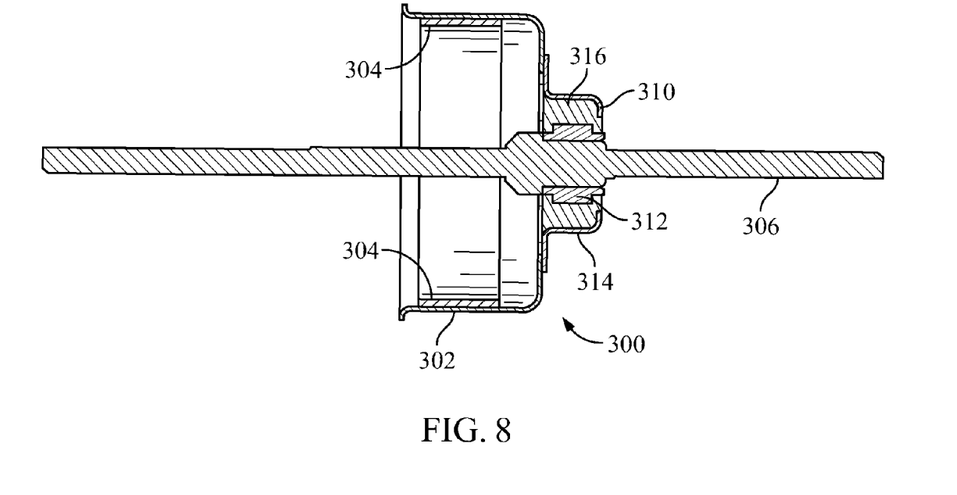
FIG. 8 is an illustration of a rotor assembly for an external rotor motor, the rotor assembly including a resilient member between the shaft and the rotor cup.

Now referring to FIG. 8, vibration suppression is also desirable for an external rotor motor, which is sometimes referred to as an inside-out motor, where the rotor 300 surrounds a stator (not shown). In FIG. 8, the stator is not shown for clarity, and the rotor 300 includes a rotor cup 302 having magnets 304 mounted therein, rotor cup 302 being resiliently mounted to shaft 306. A resilient ring assembly 310 includes an inner rigid structure 312 that engages shaft 306, and an outer rigid structure 314 that is attached to rotor cup 302. Between inner rigid structure 312 and outer rigid structure 314 is a resilient component 316 that provides a flexible mechanical connection between inner rigid structure 312 and outer rigid structure 314. As is easily understood, the attachment between outer rigid structure 314 and rotor cup 302 may be any kind of mechanical attachment, such as welding.

Figure 9:
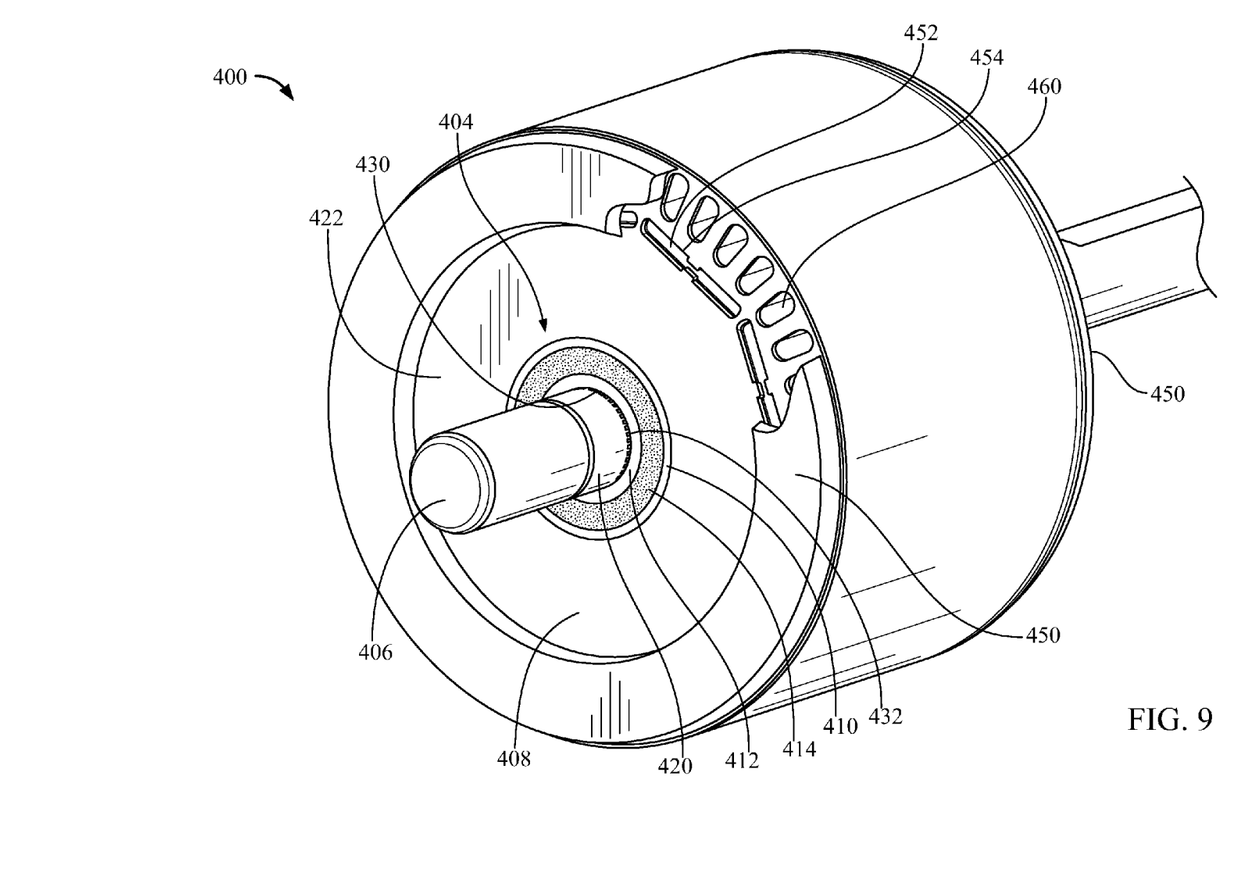
FIG. 9 is an illustration of a permanent magnet synchronous motor that incorporates a resilient member between the shaft and the rotor core.

FIG. 9 is an illustration of a rotor assembly 400 for a permanent magnet synchronous motor. Rotor assembly 400 incorporates a resilient structure 404 between the shaft 406 and the rotor core 408. Similar to the embodiments described above, the resilient structure 404 includes an outer rigid structure 410, an inner rigid structure 412, and a resilient component 414 that is in the annular space between the inner rigid structure 412 and the outer rigid structure 410. As shown in FIG. 9, these three components are located proximate a hub 420 of rotor assembly 400 such that inner rigid structure 412 engages shaft 406 and outer rigid structure 410 engages, for example, a laminated structure 422 that makes up the remainder of the rotor assembly 400.

In embodiments, an interior surface 430 of inner rigid structure 412 is attached to the corresponding portion 432 of shaft 406 to provide rotation of shaft 406. In specific embodiments, interior surface 430 of inner rigid structure 412 as well as the corresponding portion 432 of shaft 406 are keyed such that rotation of rotor assembly 400 ensures rotation of shaft 406. In various embodiments, the three components (outer rigid structure 410, inner rigid structure 412, and resilient component 414) are fabricated as separate components or are molded together as a single component. Fabrication includes placing inner rigid structure 412 within a bore extending through the resilient component 414. In various implementations, two resilient structures 404 are utilized in a motor configuration, for example, one on each end of a rotor. Alternatively, a single resilient structure 404 may be utilized proximate the axial center of rotor assembly 400. As those skilled in the art will come to understand, resilient structure 404 is generally equivalent to resilient structure 204 with respect to FIG. 5. Further, an embodiment which does not utilize an outer rigid structure 410 is contemplated which is generally equivalent to the embodiment shown and described with respect to FIG. 6.

An end ring 450 is shown in cutaway view illustrating the interior magnets 452 placed in slots 454 therein as is known for fabrication of permanent magnet synchronous motors. Longitudinal passages 460 are shown due to the cutaway view and are utilized to flow aluminum material therethrough as the end ring 450 is formed. The finished product therefore includes two cast aluminum end rings 450 that are interconnected by the cast aluminum that extends through the multiple passages 460.

With respect to all the described embodiments, attachment between the outer rigid structure and the rotor and attachment between the inner rigid structure and the shaft is not unlike the placement of a bearing between a stationary structure and a shaft. However, in the described embodiments, rather than operating as a bearing, the resilient component provides a flexible mechanical connection between the shaft and the rotor. The outer rigid structure and the inner rigid structure may be formed from laminations or may be formed as a solid component.

The various embodiments described herein disclose a resilient rotor assembly which includes a resilient component that provides for a flexible mechanical connection between a rotor and a shaft in a motor. In the described embodiments, the resilient component isolates the shaft from the torque pulses created by the magnets in the rotor. As has been described, a variety of implementations are possible for getting the desired resiliency while still attaching the resilient component to the central core of the rotor.

For cost effectiveness and in certain embodiments, it is desirable to use a central blank that is formed upon a punch operation that occurs during fabrication of stators. Specifically, instead of scrapping the central blank it is more cost effective to use the resultant central blank to fabricate the rotor core, and possibly the outer rigid structure and the inner rigid structures as well. The embodiments allow use of laminated as well as solid structures for the rotor.

In a specific implementation of the described embodiments, a 10-pole resilient rotor assembly was constructed as shown, for example, in FIG. 7. The resulting rotor assembly was assembled into a motor that utilized a three phase, salient pole 12-slot stator. The motor was mounted in a blower assembly and noise testing was performed inside an anechoic chamber. The noise data taken and illustrated in FIGS. 10 and 11 clearly shows the effectiveness of resilient rotor construction.

Even with a well-designed brushless motor, residual torque ripple and magnetic rotor/stator cogging become acoustically significant when these torsional forces drive the lightly damped rotor-shaft-fan (or wheel) torsional resonance. This issue is characteristic of any direct drive fan application. To lower the frequency of these resonances below the operating speed range, and to provide damping during starting and coasting, a resilient rotor is needed.

Figure 10:
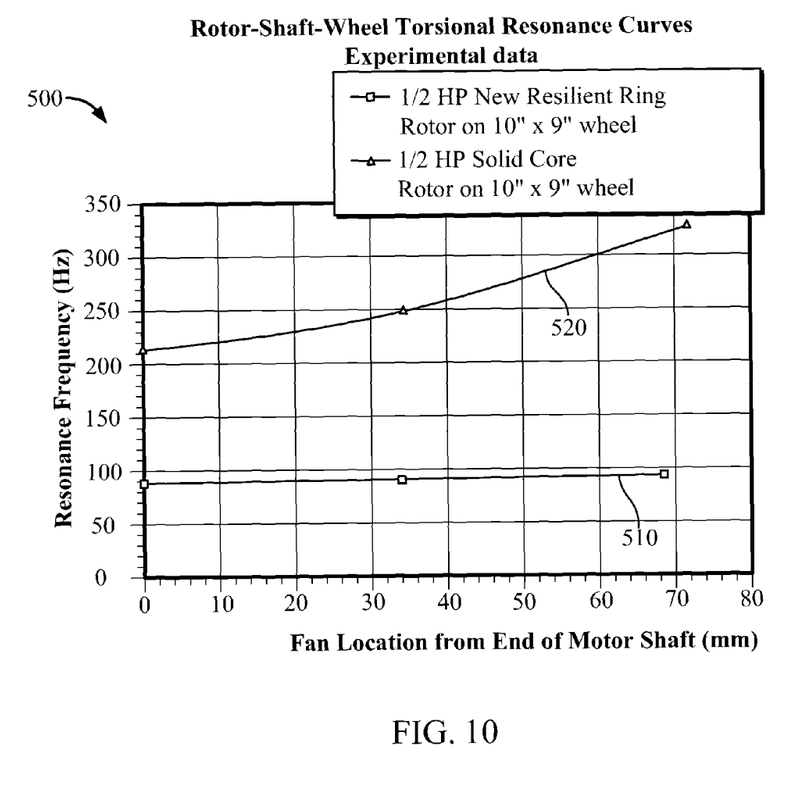
FIG. 10 is a graph illustrating the torsional frequency response of a motor incorporating a resilient rotor and that of a standard rigid rotor motor.
Figure 11:
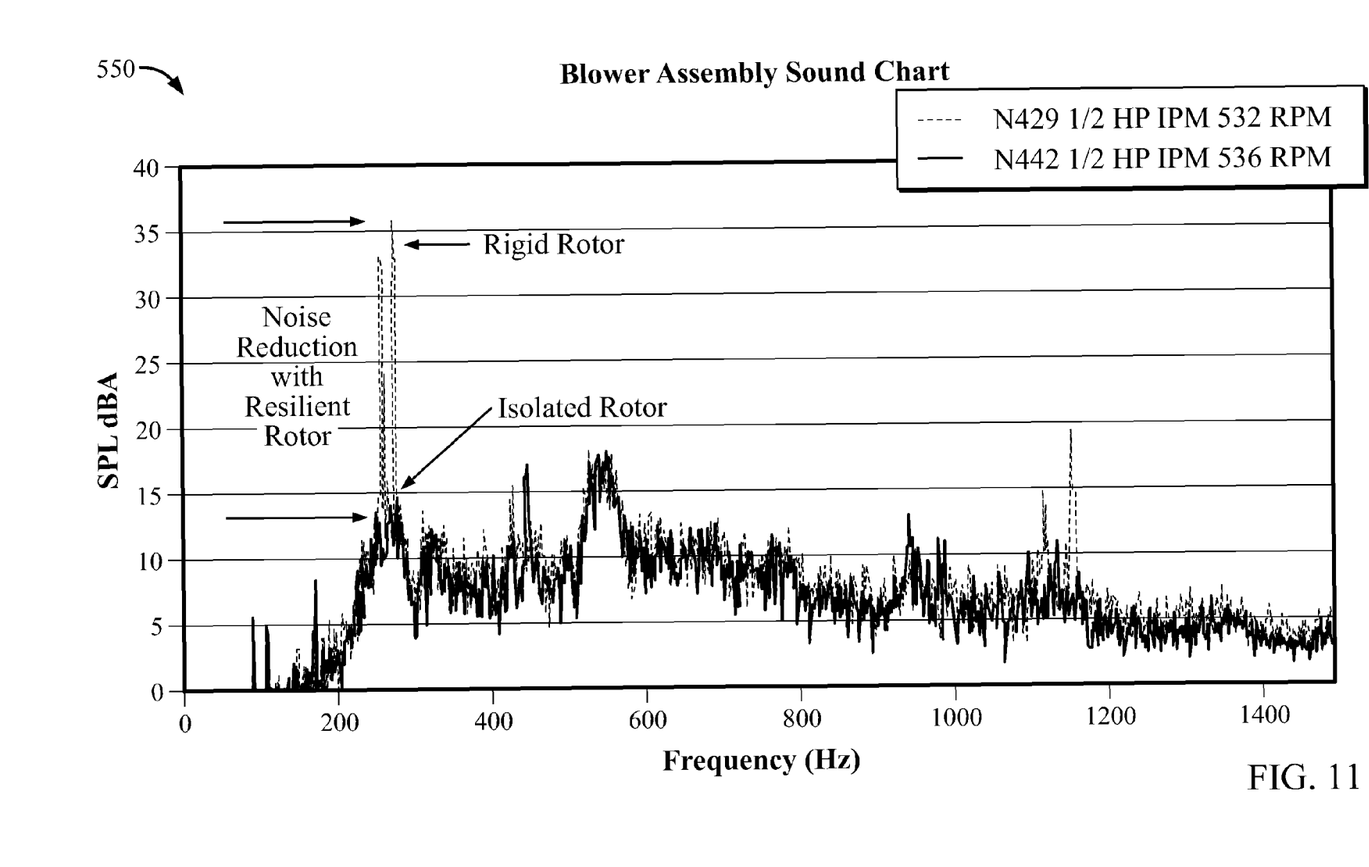
FIG. 11 is a graph illustrating the corresponding noise reduction of a resilient rotor motor as compared to a standard rigid rotor motor when operated near resonance.

In graph 500 of FIG. 10, the torsional frequency response 510 of a motor incorporating a resilient rotor is compared to the torsional frequency response 520 of a standard rigid rotor motor. In the graph 500, the resonance frequency is compared for varying distance between the fan and the rotor core. FIG. 11 is a graph 550 illustrates the corresponding noise reduction of the resilient (isolated) rotor motor compared to the solid rotor motor when operated near resonance.

While the invention has been described in terms of various specific embodiments, those skilled in the art will recognize that the invention can be practiced with modification within the spirit and scope of the claims.

What is claimed is:

1. An electric motor comprising:
    a shaft;
    an interior magnet rotor core comprising a central bore and a pair of opposing ends faces; and
    at least one resilient structure inserted within said central bore between said pair of opposing end faces such that said at least one resilient component does not extend beyond at least one of said opposing end faces, said resilient structure comprising:
        an outer rigid structure inserted within said central bore;
        a resilient component inserted within said outer rigid structure; and
        an inner rigid structure inserted within said resilient component, wherein said shaft is inserted through said inner rigid structure.

2. An electric motor according to claim 1, wherein said outer rigid structure and said inner rigid structure are laminated structures having a plurality of laminated sheets.

3. An electric motor according to claim 1, wherein said resilient structure is coupled between said shaft and said rotor core without welding said resilient structure to said shaft or said rotor core.

4. An electric motor according to claim 3, wherein said outer rigid structure is configured to be coupled within said rotor core without welding said outer rigid structure to said rotor core and said inner rigid structure is configured to be coupled to said shaft without welding said inner rigid structure to said shaft.

5. An electric motor according to claim 1, wherein said inner rigid structure and at least a corresponding portion of said shaft are keyed such that rotation of said rotor core facilitates rotation of said shaft.

6. An electric motor according to claim 1, wherein at least a portion of said rotor core comprises said outer rigid structure.

7. An electric motor according to claim 1, wherein said outer rigid structure comprises:
    a flange extending around a perimeter of said outer rigid structure and over at least a portion of at least one of said opposing end faces, said flange comprising at least one hole therethrough; and
    at least one attachment device configured for engagement with said flange and a corresponding bore within said rotor core.

8. An electric motor according to claim 1, wherein said at least one resilient structure comprises a resilient structure proximate each of said opposing end faces.

9. An electric motor according to claim 1, wherein at least one resilient structure comprises a resilient structure positioned substantially mid-way between said opposing end faces.

10. A rotor assembly comprising:
    a pair of opposing end faces;
    an interior magnet rotor core positioned between said pair of opposing end faces, said rotor core comprising a central rotor core bore therethrough;
    a resilient component coupled to said rotor core within said central rotor core bore and between said pair of opposing end faces, said resilient component comprising a central resilient component bore therethrough; and
    an inner rigid structure coupled to said resilient component within said central resilient component bore and between said pair of opposing end faces, said inner rigid structure comprising a central inner rigid structure bore therethrough configured to receive a shaft.

11. A rotor assembly according to claim 10 further comprising an outer rigid structure configured to be coupled to said rotor core within said central rotor core bore and comprising a central outer rigid structure bore therethrough that is configured to receive said resilient component.

12. A rotor assembly according to claim 11, wherein said outer rigid structure is a substantially ring-shaped laminated structure having a plurality of laminated sheets.

13. A rotor assembly according to claim 11, wherein said outer rigid structure is configured to be coupled within said central rotor core bore using at least one of rivets, nuts and bolts, keyways, and adhesives.

14. A rotor assembly according to claim 11, wherein said outer rigid structure is configured to be coupled within said central rotor core bore without welding said outer rigid structure within said central rotor core bore.

15. A rotor assembly according to claim 10, wherein said inner rigid structure is a substantially ring-shaped laminated structure having a plurality of laminated sheets.

16. A method of assembling an interior magnet rotor core motor, said method comprising:
    providing an interior magnet rotor core including a central rotor core bore and a pair of opposing ends faces;
    coupling an outer rigid structure within the central rotor core bore, the outer rigid structure including a central outer rigid structure bore;
    coupling a resilient component within the central outer rigid structure bore, the resilient component including a central resilient component bore;
    coupling an inner rigid structure within the central resilient component bore, the inner rigid structure including a central inner rigid structure bore; and
    coupling a shaft within the central inner rigid structure bore, wherein the outer rigid structure, the resilient component, and the inner rigid structure are positioned between the pair of opposing end faces such that none of the outer rigid structure, the resilient component, and the inner rigid structure extend beyond at least one of the opposing end faces.

17. The method according to claim 16, wherein coupling an outer rigid structure within the central rotor core bore comprises coupling the outer rigid structure within the central rotor core bore without welding the outer rigid structure to the rotor core.

18. The method according to claim 16, wherein coupling an outer rigid structure within the central rotor core bore comprises coupling the outer rigid structure within the central rotor core bore using at least one of rivets, nuts and bolts, keyways, and adhesives.

19. The method according to claim 16, wherein coupling an outer rigid structure within the central rotor core bore comprises coupling the outer rigid structure within the central rotor core bore using a press fit.

20. The method according to claim 16, wherein coupling a resilient component within the central outer rigid structure bore comprises coupling the resilient component within the central outer rigid structure bore proximate each of the pair of opposing end faces.

\* \* \* \* \*